United States Patent
Himmelmann et al.

(10) Patent No.: US 11,800,214 B2
(45) Date of Patent: Oct. 24, 2023

(54) REAL TIME CAMERA-BASED VISIBILITY IMPROVEMENT IN ATMOSPHERIC SUIT

(71) Applicant: Hamilton Sundstrand Space Systems International, Inc., Windsor Locks, CT (US)

(72) Inventors: Ashley Rose Himmelmann, Beloit, WI (US); Jake Rohrig, Simsbury, CT (US); Monica Torralba, Antioch, CA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/568,103

(22) Filed: Jan. 4, 2022

(65) Prior Publication Data
US 2023/0217094 A1    Jul. 6, 2023

(51) Int. Cl.
 *H04N 23/62*   (2023.01)
 *H04N 7/18*    (2006.01)
 *H04N 23/611*  (2023.01)

(52) U.S. Cl.
 CPC ............ *H04N 23/62* (2023.01); *H04N 7/181* (2013.01); *H04N 23/611* (2023.01)

(58) Field of Classification Search
 CPC . H04N 5/23216; H04N 5/23219; H04N 7/181
 See application file for complete search history.

(56) References Cited

U.S. PATENT DOCUMENTS

| | | |
|---|---|---|
| 9,104,271 B1 | 8/2015 | Adams et al. |
| 9,500,868 B2 | 11/2016 | Dopilka et al. |
| 9,787,892 B2 | 10/2017 | Henn |
| 2016/0156838 A1* | 6/2016 | Cheng ............... G06V 40/20 348/222.1 |
| 2019/0246036 A1 | 8/2019 | Wu et al. |
| 2019/0256229 A1 | 8/2019 | Griffin et al. |
| 2020/0326537 A1* | 10/2020 | Busey ............... G02B 27/0101 |
| 2021/0316167 A1 | 10/2021 | Keith |

FOREIGN PATENT DOCUMENTS

| | | |
|---|---|---|
| EP | 3042697 A1 | 7/2016 |
| FR | 2616413 A1 | 12/1988 |

OTHER PUBLICATIONS

Extended European Search Report for EP Application No. 22217156.3, dated May 26, 2023, pp. 1-8.

* cited by examiner

*Primary Examiner* — Gelek W Topgyal
(74) *Attorney, Agent, or Firm* — CANTOR COLBURN LLP

(57) ABSTRACT

A system for visibility in an atmospheric suit includes a camera arranged to view an environment outside the atmospheric suit and a display device to display an image obtained by the camera. An input device obtains input from a wearer of the atmospheric suit. A controller changes a feature of the camera based on the input. The image obtained by the camera and displayed by the display device is modified based on the feature.

10 Claims, 3 Drawing Sheets

REAL TIME CAMERA-BASED VISIBILITY IMPROVEMENT IN ATMOSPHERIC SUIT

BACKGROUND

Exemplary embodiments pertain to the art of atmospheric suits and, in particular, to real time camera-based visibility improvement in an atmospheric suit.

In some environments and applications, an atmospheric suit is used not only for protection against impacts but also to maintain a habitable environment. In a space application, for example, an extravehicular mobility unit (EMU), which includes a helmet and full body suit supplied by an oxygen tank, maintains an environment that sustains the astronaut. The setting (e.g., space) that requires the atmospheric suit may present challenges to visibility for the wearer of the atmospheric suit.

BRIEF DESCRIPTION

In one exemplary embodiment, a system for visibility in an atmospheric suit includes a camera arranged to view an environment outside the atmospheric suit and a display device to display an image obtained by the camera. An input device obtains input from a wearer of the atmospheric suit. A controller changes a feature of the camera based on the input. The image obtained by the camera and displayed by the display device is modified based on the feature.

In addition to one or more of the features described herein, the input device is a microphone to obtain the input as audio input.

In addition to one or more of the features described herein, the input device is a second camera to capture images of the wearer of the atmospheric suit and the input is obtained as gestures.

In addition to one or more of the features described herein, the input device is a second camera to capture images of an eye of the wearer of the atmospheric suit and the input is obtained through eye tracking.

In addition to one or more of the features described herein, the input device is a glove of the atmospheric suit and the input is obtained through hand movements in the glove.

In addition to one or more of the features described herein, the feature is a magnifying feature.

In addition to one or more of the features described herein, the feature is contrast control.

In addition to one or more of the features described herein, the system also includes a second camera arranged to view the environment outside the atmospheric suit.

In addition to one or more of the features described herein, the controller selects the camera or the second camera as a selected camera based on additional input from the wearer of the atmospheric suit.

In addition to one or more of the features described herein, the controller applies the change of the feature to the selected camera.

In another exemplary embodiment, a method of assembling a system for visibility in an atmospheric suit includes arranging a camera to view an environment outside the atmospheric suit and arranging a display device to display an image obtained by the camera. An input device is arranged to obtain input from a wearer of the atmospheric suit, and a controller is configured to change a feature of the camera based on the input. The image obtained by the camera and displayed by the display device is modified based on the feature.

In addition to one or more of the features described herein, the arranging the input device includes arranging a microphone to obtain the input as audio input.

In addition to one or more of the features described herein, the arranging the input device includes arranging a second camera to capture images of the wearer of the atmospheric suit and the input is obtained as gestures.

In addition to one or more of the features described herein, the arranging the input device includes arranging a second camera to capture images of an eye of the wearer of the atmospheric suit and the input is obtained through eye tracking.

In addition to one or more of the features described herein, the arranging the input device includes configuring a glove of the atmospheric suit and the input is obtained through hand movements in the glove.

In addition to one or more of the features described herein, the feature is a magnifying feature.

In addition to one or more of the features described herein, the feature is contrast control.

In addition to one or more of the features described herein, the method also includes arranging a second camera to view the environment outside the atmospheric suit.

In addition to one or more of the features described herein, the configuring the controller includes the controller selecting the camera or the second camera as a selected camera based on additional input from the wearer of the atmospheric suit.

In addition to one or more of the features described herein, the configuring the controller includes the controller applying the change of the feature to the selected camera.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an atmospheric suit maintains a habitable environment for the wearer in different applications. In the exemplary space application, the atmospheric suit may be an EMU. As also noted, the setting that requires the atmospheric suit may present challenges to visibility for the wearer of the atmospheric suit. For example, depth perception is difficult in space due to the lack of contrast. As another example, shadowing can be intense based on the angle to the sun. Embodiments of the systems and methods detailed herein relate to real time camera-based visibility improvement in an atmospheric suit. One or more cameras may provide a real time display to the wearer of the atmospheric suit and facilitate enhancements (e.g., magnification, contrast control) that address the challenges to visibility.

Figure 1:
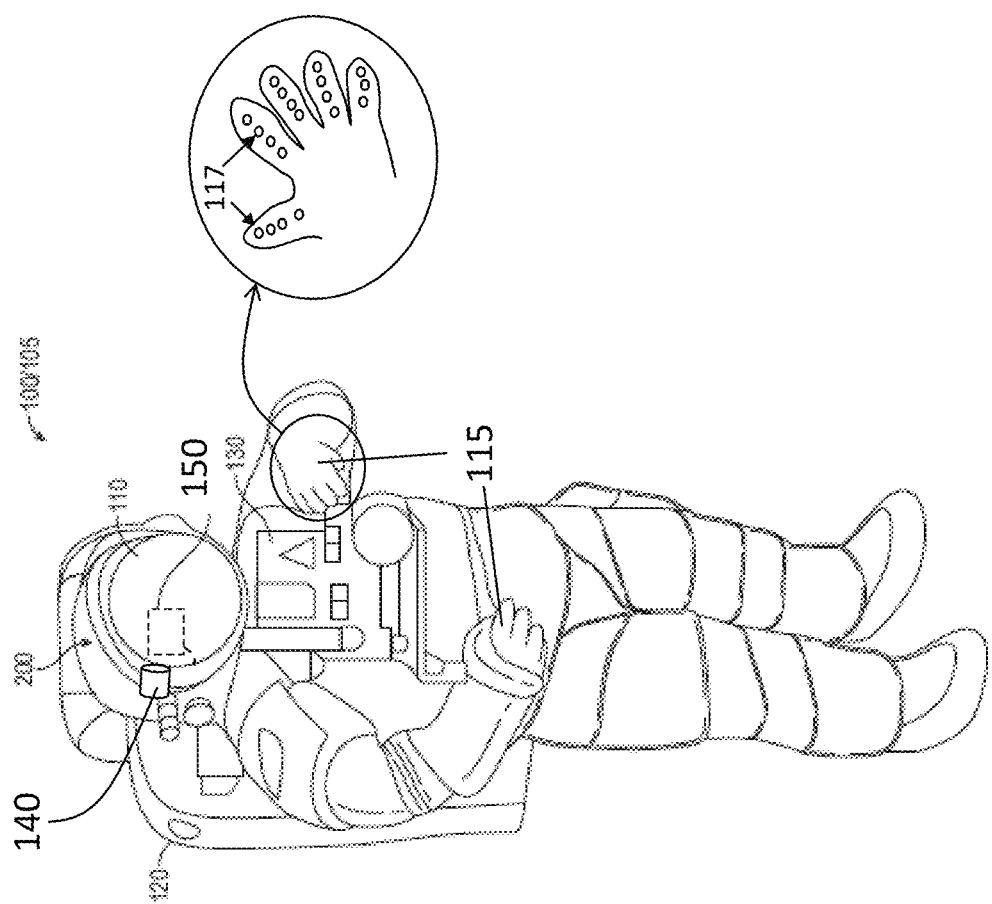
FIG. 1 shows an atmospheric suit that includes the real time camera-based visibility improvement according to one or more embodiments.

FIG. 1 shows an atmospheric suit 100 that includes the real time camera-based visibility improvement according to one or more embodiments. The exemplary atmospheric suit 100 shown in FIG. 1 is an EMU 105. While an EMU and a space application are specifically discussed for explanatory purposes, applications for the real time camera-based visibility improvement according to one or more embodiments may also include underwater (e.g., in an atmospheric diving suit), earth-based (e.g., in a hazmat suit or contamination suit), high-altitude (e.g., in a flight suit), and sub-surface environments. Generally, any suit that includes the helmet to maintain a habitable environment is referred to as an atmospheric suit.

The EMU 105 includes a helmet 110, shown with an exemplary helmet-mounted camera 140 and an exemplary in-helmet display 150. The EMU 105 also includes gloves 115. As the expanded image shows, one or both gloves 115 may be a wired glove with known sensors 117 that facilitate capture of physical data (e.g., bending of fingers) as input. Systems that are affixed as part of the EMU 105 include a primary life support system (PLSS) 120 and a display and control module (DCM) 130. These systems 120, 130, along with components of the EMU 105, create a habitable environment for a wearer performing extravehicular activity in space. During extravehicular activity, such as exploration of a planetary surface, for example, it may be difficult to judge the distance to a feature of interest because depth perception is affected. Misjudging distance can not only be inconvenient but may also be dangerous because a longer-than-expected distance may tax oxygen and other life support resources of the EMU 105. As further discussed with reference to FIGS. 2 and 3, features of a camera 140 may be employed in real time to obtain more accurate information about the surroundings of a wearer of the EMU 105.

Figure 2:
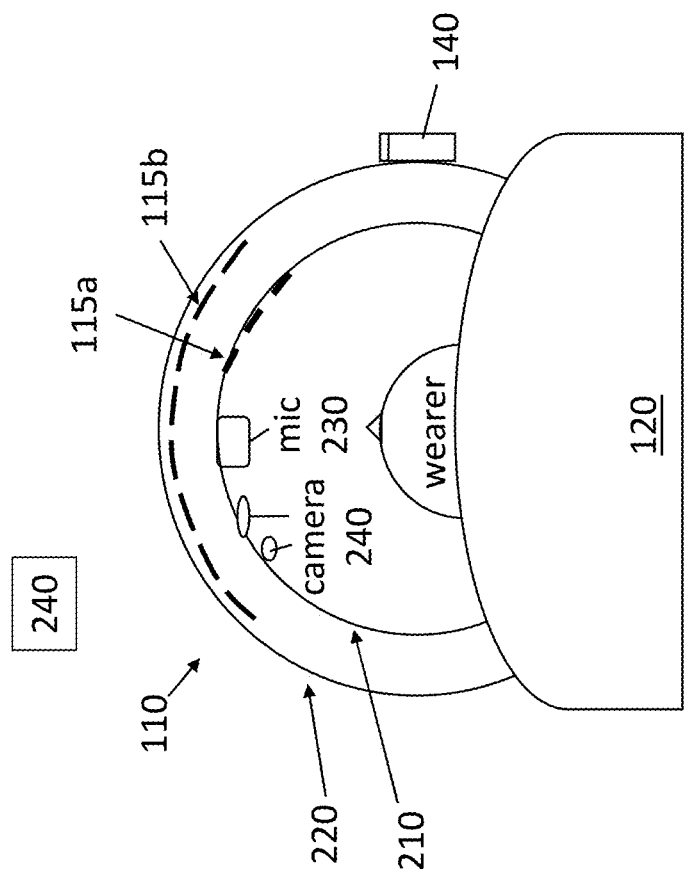
FIG. 2 details aspects of the helmet and devices used for real time camera-based visibility improvement in an atmospheric suit according to one or more embodiments.

FIG. 2 details aspects of the helmet 110 and devices used for real time camera-based visibility improvement in an atmospheric suit 100 according to one or more embodiments. The helmet 110 includes an inner shell 210 that maintains the habitable environment for the wearer of the atmospheric suit 100 and an outer shell 220 that absorbs impacts and protects the habitable environment maintained within the inner shell 210. The perspective view is from the top down in FIG. 2. The head of the wearer moves independently of the helmet 110 and, in the view shown in FIG. 2, the face of the wearer is indicated as pointing to the center of the transparent part (i.e., inner shell 210) of the helmet 110.

While the exemplary display device 115 shown in FIG. 1 may be a screen that may be moved by a swing arm, for example, two exemplary organic light emitting diode (OLED) display devices 115a, 115b are shown in FIG. 2. Generally, the layers that make up an OLED include a substrate, anode, conductive layer, emissive layer, and cathode. Based on an applied voltage, electrons flow from the cathode to the anode and the emissive layer emits radiation whose frequency is in the visible range. Thus, the OLED is self-illuminating and does not require a separate light source. In the exemplary case, the layers of the OLED display devices 115a, 115b are transparent and the substrate is the inner shell 210 in the case of the display device 115a and the substrate is the outer shell 220 in the case of the in-helmet display device 115b.

The display device 115 shown in FIG. 1 and the OLED display devices 115a, 115b shown in FIG. 2 are only exemplary illustrations and are not intended to limit the numbers, positions, and types of display devices 115 available to the wearer of the EMU 105. Similarly, the helmet-mounted camera 140 may be reoriented, repositioned, or may be one of two or more cameras 140 according to alternate embodiments. In addition, one or more cameras 140 may provide video, still images, or both. While a typical camera may have its features modified based on pressing buttons or operating other controls on the camera itself, such operations are difficult perform while wearing the gloves of the EMU 105. Thus, as discussed with reference to FIG. 3, audio or visual inputs may be provided to control feature selection on the camera 140 in order to improve visibility according to one or more embodiments. While features of the camera 140 are specifically discussed, images obtained with the camera 140 may additionally be processed (e.g., by processing circuitry of the DCM 130) using known image processing techniques to identify objects and improve visibility according to additional or alternate embodiments.

Exemplary features include magnification (i.e., zoom feature) and contrast. The camera 140 may include a rangefinder such that magnification is accompanied by an indication of distance on the display device 115. Even without a rangefinder, the magnification may aid depth perception by clarifying whether a particular object is in front of or behind another. Reducing contrast may mitigate the effect of shadowing that is created by the angle of sunlight, for example. While one selection is made at a time using an input device, multiple features may be selected for adjustment, in turn. For example, contrast may be adjusted after magnification has been increased. Additional selectable features may include ISO (which determines brightness), frame rate, and aperture. The number and types of features that may be selected are not intended to be limited by the examples discussed.

Also shown in FIG. 2 are a microphone 230 and two cameras 240. The numbers and locations of microphones 230 and cameras 240 are not limited by the exemplary illustration. The microphone 230 may be used as an input for voice commands. One of the cameras 240 may be used as an input for gesture detection while the other camera 240 may be used for eye tracking. While one of the internal cameras 240 may capture gestures performed with the face or head (e.g., nod), an external camera 240 (e.g., carried by the wearer of the EMU 105) may be used to capture other gestures (e.g., with the hands). Each of the inputs, alone or in combination, may be used to control the camera 140 and, more specifically, features of one or more cameras 140 that improve visibility, as further discussed with reference to FIG. 3.

Figure 3:
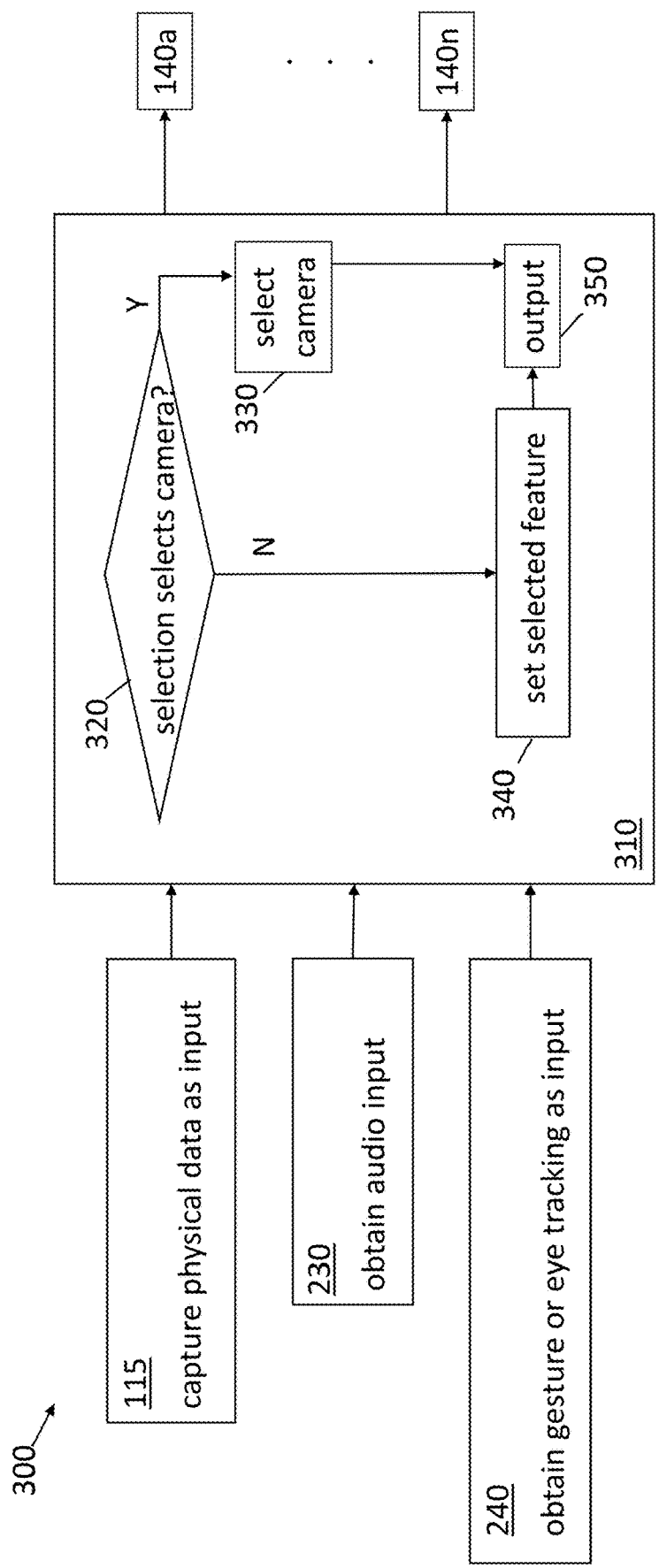
FIG. 3 is a block diagram of a system to provide real time camera-based visibility improvement in an atmospheric suit according to one or more embodiments

FIG. 3 is a block diagram of a system 300 to provide real time camera-based visibility improvement in an atmospheric suit 100 according to one or more embodiments. FIG. 3 shows a controller 310 that may be part of the DCM 130 or may be separate processing circuitry including one or more processors and memory devices to obtain inputs and provide an output to one or more cameras 140. The cameras 140 and the input devices (e.g., glove 115, microphone 230, camera 240) may be coupled to the controller 310 through wires or wirelessly.

As indicated, the controller 310 obtains inputs from one or more input devices (e.g., glove 115, microphone 230, camera 240). The glove 115 provides physical data (e.g., index finger was bent) as the input. The physical data may be mapped to specific selections in the controller 310. The microphone 230 obtains audio from the wearer of the atmospheric suit 100 as the input. The controller 310 may include known speech recognition algorithms to obtain a selection from the audio input. The camera 240 may provide images of gestures performed by the wearer of the atmospheric suit 100 as input. The controller 310 may include known gesture detection algorithms to obtain a selection from the gestures. Another camera 240 may provide images of an eye of the wearer of the atmospheric suit 100 as input. The controller 310 may perform eye tracking and map the eye movement to a selection. The eye tracking may be initiated by another input (e.g., gesture or audio command) to preclude an accidental selection.

The controller 310 performs processes, as indicated, to provide an output based on one or more inputs from one or more input devices. At block 320, the controller 310 performs a check of whether the selection obtained from the input of an input device selects a camera 140 from among two or more cameras 140*a* through 140*n*. If so, the controller 310 notes the selection of the camera 140 at block 330. If the selection does not select a camera 140, then the selection must necessarily set a feature in order to be designated as a selection based on an input. Thus, at block 340, the controller 310 sets the selected feature. At block 350, the output is either the selection of the feature that is identified by the input of the input device for all available cameras 140 or, in the case of a selection at block 330, the selection of the feature that is identified by the input of the input device for only the selected camera 140.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for visibility in an atmospheric suit having helmet, the system comprising:
    first and second cameras mounted to the helmet and arranged to view different areas of an environment outside the atmospheric suit;
    a display device within the helmet configured to display an image obtained by the first and second cameras;
    a first input device configured to obtain input from a wearer of the atmospheric suit, the first input device is a third camera mounted within the helmet and arranged to track eye movement of the wearer of the atmospheric suit and a second input device that is one or more of:
        a microphone within the helmet configured to obtain audio input from the wearer as initiating input; and
        a glove of the atmospheric suit configured to capture hand movements of the wearer as the initiating input;
    a controller configured to receive the initiating input and thereafter track eye movement of the wearer via the third camera and responsively capture images from one of the first and second cameras that is selected from the tracked eye movement of the wearer, display the captured images on the display device and adjust magnification and contrast depending on a location of an object as detected by a rangefinder of the selected one of the first and second cameras.

2. The system according to claim 1, wherein the second input device is the microphone.

3. The system according to claim 1, wherein the second input device is the glove.

4. The system according to claim 1, wherein the controller is configured to select the first camera or the second camera based on additional input from the wearer of the atmospheric suit.

5. The system according to claim 4, wherein the controller is configured to adjusting the magnification and contrast of the selected camera.

6. A method of assembling a system for visibility in an atmospheric suit having a helmet, the system comprising:
    arranging first and second cameras mounted to the helmet to view different areas of an environment outside the atmospheric suit;
    arranging a display device within the helmet to display an image obtained by the first and second cameras;
    arranging a first input device to obtain input from a wearer of the atmospheric suit, the first input device is a third camera mounted within the helmet and arranged to track eye movement of the wearer of the atmospheric suit and a second input device that is one or more of:
        a microphone within the helmet configured to obtain audio input from the wearer as initiating input; and
        a glove of the atmospheric suit configured to capture hand movements of the wearer as the initiating input;
    configuring a controller to receive the initiating input and thereafter track eye movement of the wearer via the third camera and responsively capture images from one of the first and second cameras that is selected from the tracked eye movement of the wearer, display the captured images on the display device and adjust magnification and contrast depending on a location of an object as detected by a rangefinder of the one of the first and second cameras.

7. The method according to claim 6, wherein the second input device is the microphone.

8. The method according to claim 6, second input device is the glove.

9. The method according to claim 6, wherein the configuring the controller includes the controller selecting the first camera or the second camera based on additional input from the wearer of the atmospheric suit.

10. The method according to claim 9, wherein the configuring the controller includes the controller adjusting the magnification and contrast of the selected camera.

* * * * *